United States Patent [19]

Rees et al.

[11] 4,268,241

[45] May 19, 1981

[54] HEATED INJECTION NOZZLE

[75] Inventors: Herbert Rees, Willowdale; Robert D. Schad, Schomberg, both of Canada

[73] Assignee: Husky Injection Molding Systems, Bolton, Canada

[21] Appl. No.: 56,855

[22] Filed: Jul. 12, 1979

Related U.S. Application Data

[63] Continuation of Ser. No. 867,505, Jan. 6, 1978, abandoned.

[51] Int. Cl.³ .............................. B29F 1/03; B29F 1/08
[52] U.S. Cl. .................................... 425/549; 425/548
[58] Field of Search ............. 425/549, 568, DIG. 224, 425/DIG. 229, 548, 566; 239/113, 117, 533.1, 584; 222/146 HE, 504, 559

[56] References Cited

U.S. PATENT DOCUMENTS

| | | | |
|---|---|---|---|
| 2,411,847 | 12/1946 | Bokeeno | 425/547 X |
| 2,529,146 | 11/1950 | Feitl | 425/549 X |
| 2,566,101 | 8/1951 | Vltarsky | 425/549 |
| 2,567,147 | 9/1951 | Cousino | 425/547 X |
| 3,037,245 | 6/1962 | Darnell | 425/449 |
| 3,530,539 | 9/1970 | Gellert | 425/547 |
| 3,677,682 | 7/1972 | Putkowski | 425/548 X |
| 4,043,740 | 8/1977 | Gellert | 425/548 |
| 4,173,448 | 11/1979 | Rees | 425/549 |

FOREIGN PATENT DOCUMENTS

| | | | |
|---|---|---|---|
| 236012 | 2/1964 | Austria | 239/132 |
| 2222558 | 11/1973 | Fed. Rep. of Germany | 219/535 |
| 2614911 | 10/1976 | Fed. Rep. of Germany | 425/569 |

*Primary Examiner*—Thomas P. Pavelko
*Attorney, Agent, or Firm*—Karl F. Ross

[57] ABSTRACT

A nozzle for the injection of liquefied plastic material into the gate of a mold cavity has a tubular metallic body forming a sprue, the outer surface of this body being in contact with an annular heater in the shape of a closed shell whose interior is filled with a matrix of compacted MgO powder having one or more resistance wires embedded therein. The heater is held in position by a nut, threaded onto a gate-side extremity of the body, against a shoulder or a tapering surface portion thereof and is separated by an air space from a surrounding supporting structure.

8 Claims, 2 Drawing Figures

HEATED INJECTION NOZZLE

This is a continuation of application Ser. No. 867,505, filed Jan. 6, 1978 now abandoned.

FIELD OF THE INVENTION

Our present invention relates to an injection-molding machine of the hot-runner type and, more particularly, to a nozzle for feeding liquefied plastic material from a sprue channel to an injection gate of a mold cavity.

BACKGROUND OF THE INVENTION

To maintain the fluidity of the oncoming plastic material during closure of the injection gate, enabling its use in a following molding cycle, it is desirable to form a terminal part of the sprue channel as an axial bore of a nozzle of good thermal conductivity closely surrounded by an electrical heating element. The heating element should be removably mounted on the nozzle for ready replacement in the event of a defect and should also be physically separated from a nozzle-supporting plate acting as a heat sink. For the sake of compactness, its axial and radial dimensions should be as small as possible.

OBJECT OF THE INVENTION

The object of our present invention, therefore, is to provide an improved injection nozzle satisfying these requirements.

SUMMARY OF THE INVENTION

A heater-equipped nozzle according to our invention is provided with a highly heat-conductive tubular insert defining a terminal part of the sprue channel, this insert being received in an annular recess of the nozzle body and having a tip separated from a downstream extremity of that body by a surrounding clearance which is occupied by an annular heat shield preferably also extending into a space between that tip and a mold plate engaged by the nozzle extremity.

Advantageously, in accordance with our present invention, the nozzle heater has an annular shell filled with a compact comminuted mass of refractory, electrically insulating material, preferably magnesium oxide, in which one or more resistance wires are embedded.

Such a shell can be fastened to the tubular nozzle body with the aid of a nut engaging the threaded extremity of that body proximal to the injection gate. The shell may be pressed by the nut against an outer peripheral shoulder of the body defining its axial position; such an abutment, however, becomes unnecessary if the body is tapered toward its threaded extremity and the shell has a complementary taper.

BRIEF DESCRIPTION OF THE DRAWING

The above and other features of our invention will now be described in detail with reference to the accompanying drawing in which.

SPECIFIC DESCRIPTION

Figure 1:
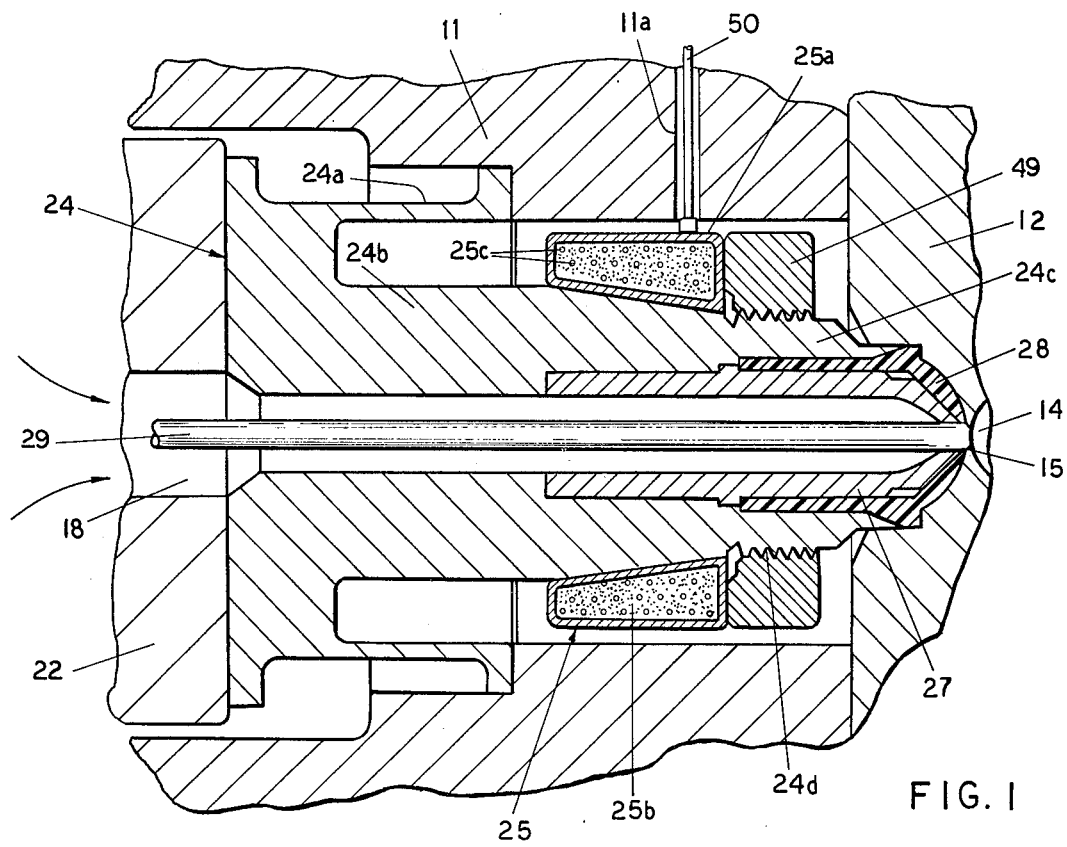
FIG. 1 is a cross-sectional view of our improved nozzle, also showing adjacent structural elements.

In FIG. 1 we have shown part of a hot-runner structure 22 serving to supply liquefied thermoplastic resin from a nonillustrated pressure chamber via a sprue channel 18 to an injection gate 15 of a mold plate 12. Gate 15 is alternately openable and closable by a rod or pin 29 which is rigid with a double-acting piston in a nonillustrated fluid cylinder whose operation is synchronized with the movement of another mold plate (not shown) coacting with plate 12 to form a mold cavity 14 as is well known per se. For a particularly advantageous construction of such a piston-and-cylinder assembly, reference may be made to our copending application Ser. No. 867,506 of even date.

A cooled intermediate or backing plate 11, inserted between the mold plate 12 and the hot-runner structure 22 as more fully illustrated in our aforementioned copending application, supports a nozzle 24 provided with an annular skirt 24a surrounding tubular nozzle body 24b from which it is separated by a cylindrical air gap. A tubular insert 27 of highly heat-conductive material, such as beryllium/copper, is seated in nozzle body 24b and extends into mold plate 12 as a guide for the free end of valve rod 29. An annular space existing between nozzle body 24b, the tip of insert 27 and mold plate 12 is occupied by a sheath 28 of resinous material which may be prefabricated or is formed from the overflow of injected resin in the first operating cycle or cycles. Thus, there is only minimal contact between insert 27 and a downstream extremity 24c of nozzle body 24b engaging the relatively cold mold plate 12, the sheath 28 serving as a further thermal insulator.

Nozzle extremity 24c is formed with male screw threads 24d engaged by a nut 49 which bears upon a heating element 25 surrounding the nozzle body 24b. Heating element 25 comprises a closed annular metallic shell 25a with a frustoconical peripheral surface complementary to a tapering contact surface of body 24b. Thus, pressure of nut 49 firmly maintains the element 25 in its illustrated position near the discharge end of nozzle 24.

The interior of shell 25a is filled with comminuted magnesium oxide 25b having a resistance coil 25c embedded therein. A cable 50 passing through a bore 11a of backing plate 11 supplies heating current to coil 25c.

Figure 2:
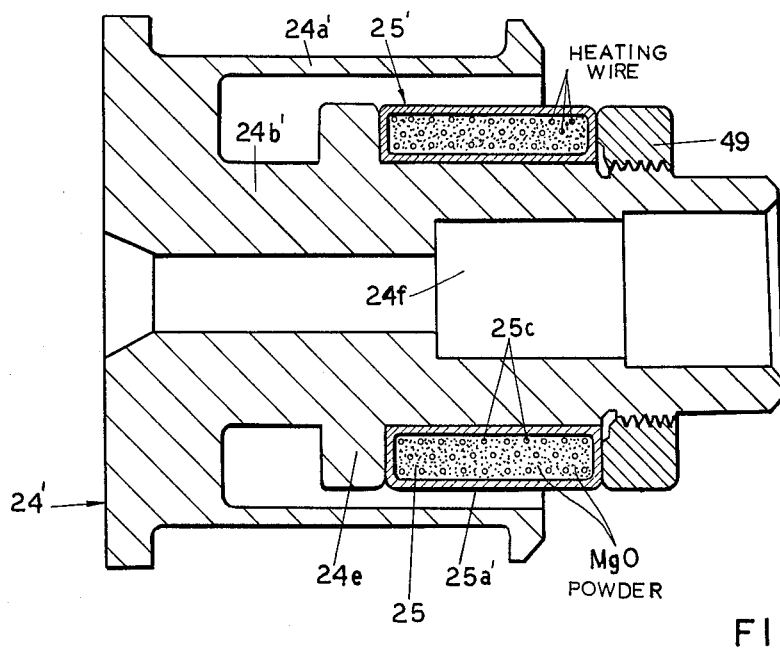
FIG. 2 is an axial sectional view of a modified nozzle according to our invention.

The thin-walled skirt 24a of nozzle 24, serving to brace the hot-runner structure 22 against backing plate 11, has an elevated thermal resistance so as to minimize the heat flow from structure 22 to plate 11. In the embodiment illustrated in FIG. 1, the skirt 24a spacedly surrounding nozzle body 24b terminates short of heater 25 which is separated by another annular air space from the surrounding plate 11; that air space, it will be noted, is defined by a bore in plate 11 whose diameter equals the outer diameter of the aforementioned cylindical air gap. As shown in FIG. 2, however, this skirt could be extended to overhang all or part of the heater.

FIG. 2 further illustrates a modified nozzle 24' which differs from nozzle 24 of FIG. 1 in that its body 24b' is cylindrical instead of tapered and is provided with an annular shoulder 24e forming a stop for a similarly modified heating element 25'. Heater 25' comprises an annular shell 25a' of rectangular rather than trapezoidal cross-section held by nut 49 against shoulder 24e. The construction of this heater is otherwise identical with that of element 25, including a wire coil 25c embedded in a matrix 25b of MgO powder.

The extension of a skirt 24a' of nozzle 24 over the major part of the peripheral surface of heater 25' reduces the amount of thermal radiation impinging from the heater upon the surrounding backing plate 11. In FIG. 2 the plate 11 has been omitted along with other parts of the assembly shown in FIG. 1, including insert 27 receivable in an annular recess 24f of the nozzle body.

We claim:

1. In an injection-molding machine including a hot-runner structure with a sprue channel for conveying liquefied plastic material to an injection gate of a mold plate, said sprue channel being formed in part by a nozzle with a tubular body of good thermal conductivity having a downstream extremity in engagement with said mold plate, and heater means closely surrounding said body in the vicinity of said gate, the improvement wherein said nozzle is provided with a highly heat-conductive tubular insert defining a terminal part of said sprue channel, said insert being received in an annular recess of said body and having a tip separated from said extremity by a surrounding clearance occupied by an annular heat shield;

said heater means comprising an annular shell externally seated on a portion of said body adjacent said extremity and spacedly surrounded by the wall of a bore formed in a cooled supporting member, said nozzle being provided at an end remote from said extremity with a skirt separated by a substantially cylindrical air gap from said body and bearing upon said supporting member, said air gap having an outer diameter exceeding that of said shell and substantially corresponding to that of said bore whereby an annular space accommodating said shell in spaced relationship with said supporting member is formed around said body.

2. The improvement defined in claim 1 wherein said heat shield extends into a space separating said tip from said mold plate.

3. The improvement defined in claim 1 wherein said shell is filled with a compacted comminuted mass of a refractory dielectric material and contains electric heat-generating means embedded in said mass.

4. The improvement defined in claim 1 wherein said mass consists of magnesium oxide.

5. The improvement defined in claim 1 wherein said skirt spacedly overhangs at least a part of said shell.

6. The improvement defined in claim 1 wherein said extremity is threaded, further comprising fastening means including a nut engaging said extremity for holding said shell in an axially fixed position on said portion.

7. The improvement defined in claim 6 wherein said portion and said shell have complementarily tapered contact surfaces.

8. The improvement defined in claim 6 wherein said portion is provided with an outer peripheral shoulder remote from said extremity forming an abutment for said shell.

* * * * *